Oct. 18, 1966 K. DEARNLEY 3,279,572
SEQUENTIALLY OPERATED CLUTCHES WITH EXTERIOR ADJUSTMENT
Filed May 4, 1964 2 Sheets-Sheet 1

Inventor
KENNETH DEARNLEY
By Norris & Bateman
Attorneys ately opposed axially extending fingers 56 project
United States Patent Office 3,279,572
Patented Oct. 18, 1966

3,279,572
SEQUENTIALLY OPERATED CLUTCHES WITH EXTERIOR ADJUSTMENT
Kenneth Dearnley, Newsome, Huddersfield, England, assignor to David Brown Tractors Limited
Filed May 4, 1964, Ser. No. 364,447
Claims priority, application Great Britain, May 17, 1963, 19,627/63
11 Claims. (Cl. 192—48)

The invention relates to dual clutch units, that is to say to clutch units capable of transmitting power through one or both of two clutches mounted in tandem.

The object of the invention is to facilitate adjustment of a dual clutch unit.

According to the invention, a dual clutch unit comprises a casing integral with, or adapted to be secured to, an engine flywheel or other rotatable element, two clutches mouned in tandem within said casing and each comprising one or more driven plates, at least one pressure plate for actuating each clutch, means for moving the pressure plate or plates of one clutch to disengage same, and adjustable means for enabling further movement in the same direction of the pressure plate, or one of the pressure plates, of said one clutch to disengage the other clutch, said adjustable means being so arranged that the amount of movement of the pressure plate, or said one of the pressure plates, of said one clutch prior to the commencement of disengagement of said other clutch is both adjustable and measurable outside said casing. Preferably, the adjustable means comprise a plurality of circumferentially spaced members connected to the pressure plate, or one of the pressure plates, of said other clutch and projecting from the casing in a direction parallel to the axis of the flywheel or other rotatable element, a spring interposed between each member and the casing to urge said pressure plate, or said one of the pressure plates, in the direction to engage said other clutch, a sleeve surrounding each of said members and engaging the pressure plate, or one of the pressure plates, of said one clutch, each sleeve projecting from the casing, a spring urging each of said sleeves into engagement with the last mentioned pressure plate, or the last mentioned one of the pressure plates, and an abutment on the projecting end of each of said members which is adjustable to vary the amount of clearance to be taken up before the projecting end of the associated sleeve contacts said abutment. Preferably, also, each abutment comprises a self-locking nut on a screwed portion of the associated member. The pressure plates are preferably drivably connected to the casing by means of gear teeth. Preferably, said one clutch is a twin-plate clutch drivably mounted on a sleeve constituting the power transmission input shaft of an agricultural tractor, and said other clutch is a single-plate clutch drivably mounted on a power takeoff shaft extending through said sleeve. Preferably, also, three pressure plates held apart at an equal distance from one another by two sets of separating springs are employed.

A preferred embodiment of the invention will now be described, by way of example only, with reference to the accompanying drawings of which:

FIG. 4 is a sectional view of a component hereinafter referred to; and

Figure 1:
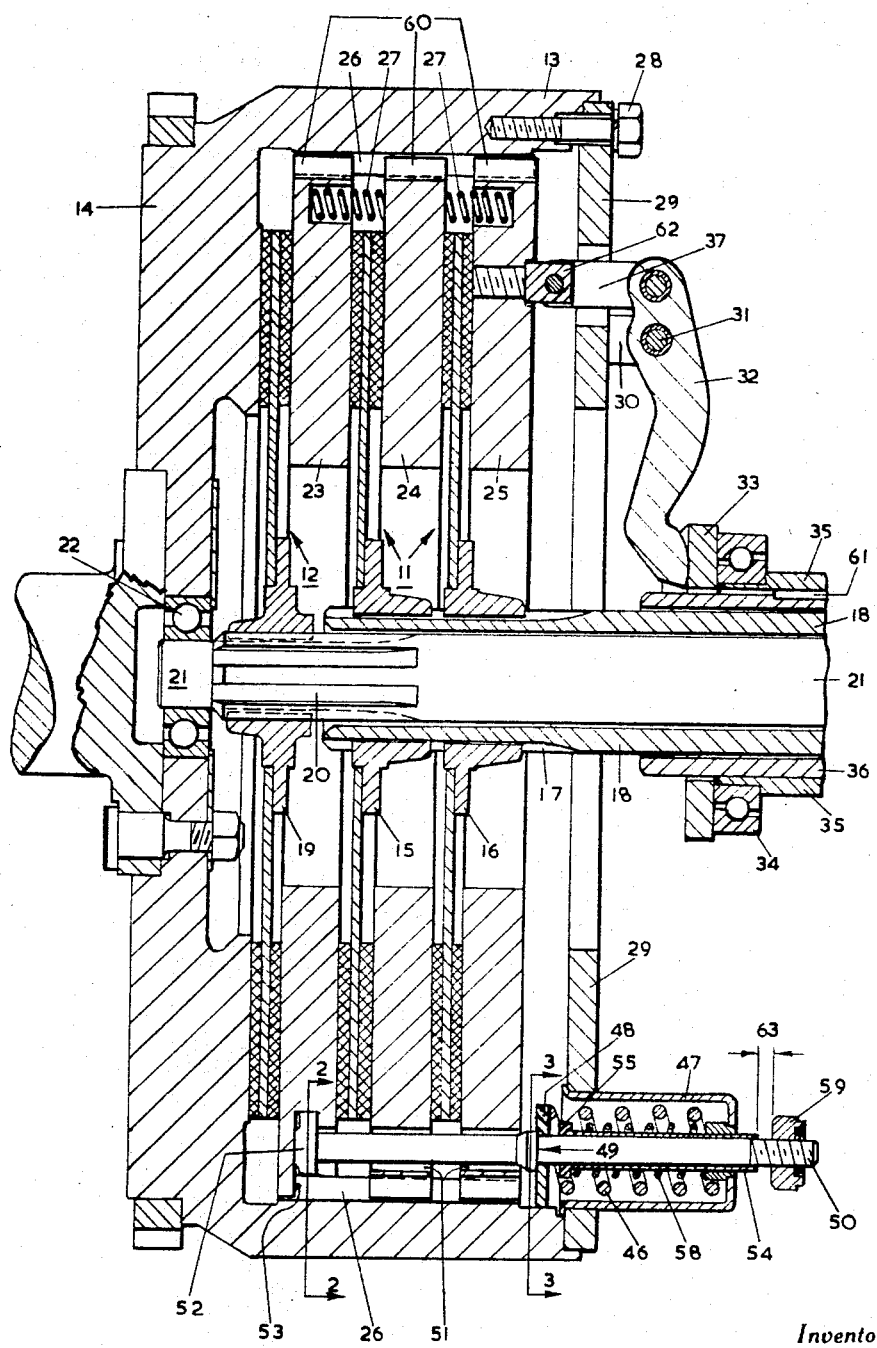
FIG. 1 is a section through the axis of a dual clutch unit according to the invention.
Figure 2:
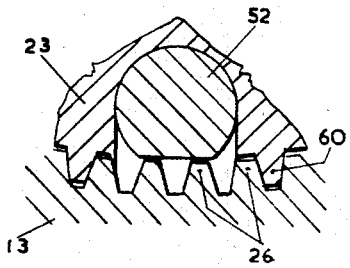
FIG. 2 is a sectional view on the line 2—2 in FIG. 1.
Figure 3:
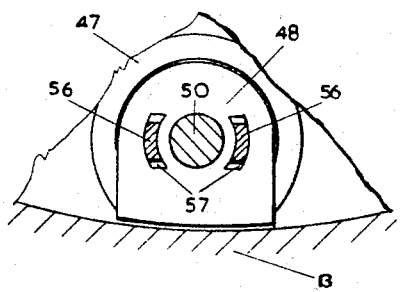
FIG. 3 is a sectional view on the line 3—3 in FIG. 1.
Figure 5:
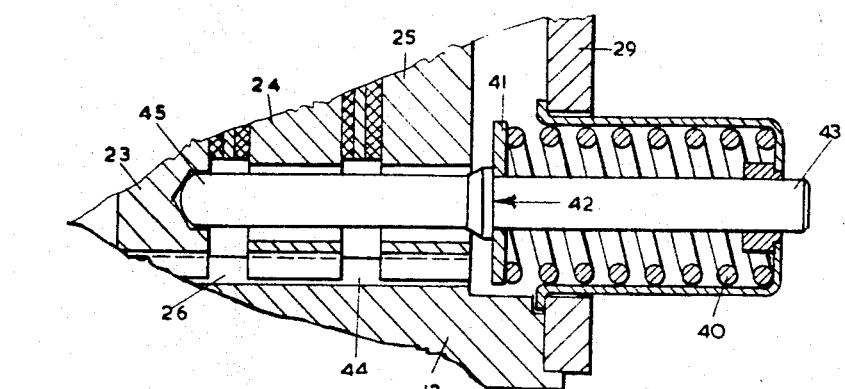
FIGS. 5 and 6 are sectional views of two spring means employed in the dual clutch unit.
Figure 4:
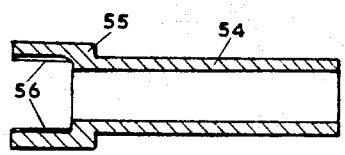
Figure 6:
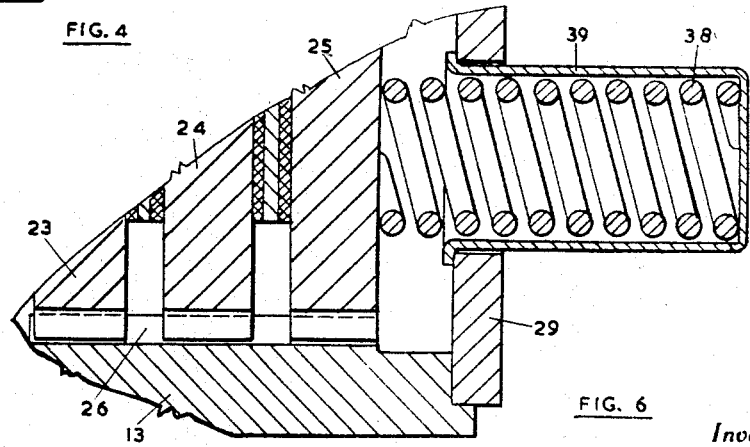

Referring now to the drawings, a dual clutch unit comprises two clutches 11 and 12 mounted in tandem within a casing 13 integral with the engine flywheel 14 of an agricultural tractor. The clutch 11 has two driven plates 15 and 16 slidably mounted on splines 17 formed on a sleeve 18 constituting the power transmission input shaft of the tractor. The clutch 12 has a single driven plate 19 slidably mounted on splines 20 formed on a power takeoff shaft 21 which extends through the sleeve 18. The front end of the power takeoff shaft 21 is carried by a bearing 22 housed in the flywheel 14, the expressions "front" and "rear" when used herein being relative to the tractor. Associated with the three driven plates 15, 16 and 19 are respective pressure plates 24, 25 and 23, each of the pressure plates being slidable axially within the casing 13, but rotatably fixed thereto, by means of gear teeth 60 formed on the periphery of the pressure plate and meshing with mating teeth 26 formed within the casing 13. The pressure plates are held apart at an equal distance from one another by two sets of helical separating springs 27. Secured by set screws 28 to the rear end of the casing 13 is an annular cover plate 29 provided with three circumferentially spaced pairs of lugs 30 each pair of which carries a pivot pin 31 for a radially extending release lever 32. The inner ends of said levers engage recesses formed in the front face of an annular release plate 33 the rear face of which is adapted to contact a thrust bearing assembly 34 mounted on a sleeve 35. Said sleeve is slidably but nonrotatably mounted by means of a key 61 on the periphery of a tubular member 36 rigidly secured to the tractor frame (not shown) and surrounding the sleeve 18 which constitutes the power transmission input shaft. The slidable sleeve 35 is provided, to the rear of the thrust bearing assembly 34, with two diametrically opposed projections against the rear faces of which there abut the ends of a throwout fork secured on a shaft extending at right angles to the axis of the flywheel and movable angularly in known manner by the operation of a foot pedal. The throwout mechanism referred to in the preceding sentence is quite conventional and has thus not been illustrated. The outer end of each release lever 32 is pivotally connected to the rear ends of two short parallel links 37 the front ends of which are pivotally connected to a block 62 secured to the rearmost pressure plate 25. Six helical thrust springs 38 housed in respective cups 39 which project rearwardly from the annular cover plate 29 contact the rearmost pressure plate 25 and urge it in the engaging direction (see FIG. 6). Each of three similarly-housed helical thrust springs 40 contacts a washer 41 abutting against a shoulder 42 on a rod 43 which passes through alined clearance holes 44 in the rearmost and intermediate pressure plates 25 and 24 and which has a part-spherical front end 45 engaging the bottom of a shallow blind hole drilled in the front pressure plate 23 (see FIG. 5). These three springs 40 thus urge the front pressure plate 23 in the engaging direction. Three further helical thrust springs 46 which are also housed in cups 47 projecting rearwardly from the annular cover plate 29 likewise act on washers 48 abutting against shoulders 49 formed on rods 50 passing through aligned clearance holes 51 in the rearmost and intermediate pressure plates 25 and 24 (see FIG. 1). However, the front ends of the rods 50 have enlarged heads 52 (see FIGS. 1 and 2) which engage recesses 53 in the front pressure plate 23 to provide an axially fixed connection to enable the rods 50 to pull said plate rearwardly, that is to say in the disengaging direction, as well as to push the plate forwardly. Surrounding each of the rods 50, to the rear of the washer 48 thereon, is a sleeve 54 having a small flange 55 at its front end (see FIGS. 1 and 4). Two diametrically opposed axially extending fingers 56 project from the front face of said flange (see FIG. 4). The fingers 56 pass freely through holes 57 in the associated washer 48 (see FIG. 3), and their front ends engage the rearmost pressure plate 25 due to the sleeve 54 being urged forwardly by a light helical compression spring 58 contacting the rear face of the flang 55 and housed within the cup 47 containing the associated helical thrust spring 46. The sleeve 54 projects rearwardly from the cup 47, and the rod 50 projects rearwardly from the sleeve 54. The rear end of said sleeve is adapted to abut against a self-locking nut 59 on a screwed portion at the rear end of the rod 50 as hereinafter described.

The dual clutch unit operates as follows:

Both of the clutches 11 and 12 are held engaged by the helical thrust springs 38, 40 and 46 when the foot pedal is not depressed, and there is a preset clearance 63 (see FIG. 1) between the rear end of each of the sleeves 54 and the associated self-locking nut 59. The construction and arrangement of the dual clutch unit is such that said clearance is both adjustable and measurable very simply and easily.

Movement of the foot pedal to an intermediate depressed position disengages the twin-plate clutch 11 which transmits drive to the power transmission input shaft 18 of the tractor, but the single-plate clutch 12 which transmits drive to the power takeoff shaft 21 remains engaged. This is achieved by movement of the foot pedal to said intermediate depressed position moving the shaft on which there is secured the throwout fork so that said fork moves the slidable sleeve 35 forwardly. Thus the thrust bearing assembly 34 mounted on the sleeve 35 moves the inner ends of the release levers 32 forwardly, and the consequential rearward movement of the outer ends of said levers acts through the two short links 37 connecting each release lever 32 to the associated block 62 so as to move the rearmost pressure plate 25 rearwardly, that is to say in the disengaging direction, against the action of its associated helical thrust springs 38. The intermediate pressure plate 24 is accordingly also moved rearwardly by the action of the helical separation springs 27. Thus the two driven plates 15 and 16 of the twin-plate clutch 11 are no longer drivably connected to the flywheel 14 by frictional engagement with the three pressure plates 23, 24 and 25. The sleeves 54 are moved rearwardly by the action of the rearmost pressure plate 25 on the fingers 56 resulting in the compression of the springs 58 associated with said sleeves, and the foot pedal reaches its intermediate depressed position when the rear end of each of the sleeves 54 contacts the associated self-locking nut 59, that is to say when the preset clearance 63 has been taken up. The front pressure plate 23 is not caused to move rearwardly by movement of the foot pedal to its intermediate depressed position because the fingers 56 formed on sleeve 54 have moved rearwardly through the holes 57 in washer 48 without displacing said washer, rod 50 and front pressure plate 23. Frictional driving engagement of the driven plate 19 of the single-plate clutch 12 with the front pressure plate 23 and with the flywheel 14 is therefore maintained by the helical thrust springs 40 and 46 associated with said pressure plate.

Further movement of the foot pedal to a fully depressed position maintains the twin-plate clutch 11 disengaged and disengages also the single-plate clutch 12. This is achieved by said further movement acting through the shaft on which there is secured the throwout fork, the throwout fork, the slidable sleeve 35, the thrust bearing assembly 34, the release levers 32, the two short links 37 associated with each release lever, and the blocks 62 to move the rearmost pressure plate 25 further to the rear against the action of its associated helical thrust springs 38. This causes the sleeves 54 surrounding the rods 50 to act through the self-locking nuts 59 to move said rods rearwardly as a result of which the front pressure plate 23 is also moved rearwardly, that is to say in the disengaging direction, against the action of its associated helical thrust springs 40 and 46. Thus the driven plate 19 of the single-plate clutch 12 is no longer drivably clamped between the flywheel 14 and the front pressure plate 23. The twin-plate clutch 11 remains disengaged and no drive is therefore transmitted to the power transmission input shaft 18 or to the power takeoff shaft 21 of the tractor.

When the foot pedal is moved back to its intermediate depressed position the single-plate clutch 12 is reengaged, and when said pedal is moved back from the last mentioned position and is no longer depressed the twin-plate clutch 11 is also reengaged, the sequence of events being the reverse of that described in the two preceding paragraphs.

What I claim is:

1. A dual clutch unit comprising a rotatable casing, two clutches mounted in tandem within said casing and each comprising at least one driven plate, pressure plate means for actuating each of said clutches, means for moving the pressure plate means of one clutch to disengage said one clutch after a predetermined movement of said pressure plate means of said one clutch in a given direction, operating means for the pressure plate means of said other clutch comprising a rigid motion transmitting member having an axially fixed connection at one end to said pressure plate means for said other clutch and extending through said casing to terminate outside the casing, and means for operably connecting said pressure plate means of said one clutch to said motion transmitting member after said pressure plate means for said one clutch has exceeded said predetermined movement in said direction for sequentially disengaging said other clutch comprising an abutment on said motion transmitting member outside the casing, and an axially slidable element normally spring biased away from said abutment toward said pressure plate means for said one clutch whereby movement of said pressure plate means for said one clutch a predetermined distance after said one clutch is disengaged results in motion transmitting connection between said pressure plate means for said one clutch and said abutment through said element and provides for clutch disengaging movement of said pressure plate means for said other clutch.

2. The dual clutch unit defined in claim 1, wherein said abutment is adjustable along said member parallel to said direction to determine the delay in disengagement of said other clutch subsequent to disengagement of said one clutch.

3. The dual clutch defined in claim 2, wherein said member is a rod, said element is a sleeve surrounding the rod and spring biased against said pressure plate means for said one clutch, and said abutment is axially adjustable along said rod outside said casing.

4. A dual clutch unit comprising a rotatable casing, two clutches mounted in tandem within said casing and each comprising at least one driven plate, pressure plate means for actuating each of said clutches, means for moving the pressure plate means of one clutch to disengage same, a plurality of circumferentially spaced members connected to the pressure plate means of said other clutch and projecting from the casing in a direction parallel to the axis of the dual clutch unit, springs interposed between said members and the casing to urge the pressure plate means of said other clutch in the direction to engage said other clutch, a sleeve surrounding each of said members and engaging the pressure plate means of said one clutch, each sleeve projecting from the casing, springs urging said sleeves into engagement with the pressure plate means of said one clutch, and an abutment on the projecting end of each of said members which is adjustable to vary the amount of clearance to be taken up before the projecting end of the associated sleeve contacts said abutment.

5. A dual clutch unit comprising a rotatable casing, two clutches mounted in tandem within said casing and each comprising at least one driven plate, pressure plate means for actuating each of said clutches, means for moving the pressure plate means of one clutch to disengage same, a plurality of circumferentially spaced members connected to the pressure plate means of said other clutch and having screwed ends which project from the casing in a direction parallel to the axis of the dual clutch unit, springs interposed between said members and the casing to urge the pressure plate means of said other clutch in the direction to engage said other clutch, a sleeve surrounding each of said members and engaging the pressure plate means of said one clutch, each sleeve projecting from the casing, springs urging said sleeves into engagement with the pressure plate means of said one clutch, and a self-locking nut on the screwed end of each of said members which is adjustable to vary the amount of clearance to be taken up before the projecting end of the associated sleeve contacts said nut.

6. A dual clutch unit comprising a first hollow power output shaft and a second power output shaft coaxially extending therethrough, a twin plate clutch comprising two driven clutch plates independently axially slidably mounted on said first shaft, a single plate clutch comprising a third driven clutch plate axially slidably mounted on said second shaft, a rotatable casing surrounding said clutches, a first pressure plate nonrotatably axially slidably mounted in said casing in operative engagement with a first of said twin clutch driven plates, a second pressure plate nonrotatably axially slidably mounted in said casing between said twin clutch driven plates, and a third pressure plate nonrotatably axially slidably mounted in said casing between the second of said twin clutch driven plates and said single clutch driven plate, spring means compressed between said second pressure plate and the pressure plates on opposite sides thereof, first thrust spring means compressed between said casing and said third pressure plate for engaging said single plate clutch, second thrust spring means compressed between the casing and said first pressure plate for engaging said twin plate clutch, means for displacing said first pressure plate a predetermined distance in the direction against the action of said second thrust spring means to disengage said twin plate clutch, and means operative upon further movement of said first pressure plate in said direction for connecting said third pressure plate to said first pressure plate to move said third pressure plate to disengage said single plate clutch.

7. In the dual clutch unit defined in claim 6, said last named means comprising a rod having an axially fixed connection to said third pressure plate and projecting axially externally of said casing, an abutment on said rod outside the casing, and lost motion means carried by said rod and interposed between said first pressure plate and said abutment.

8. In the dual clutch unit defined in claim 7, said rod being threaded outside the casing and said abutment being a nut threaded on the rod for measurable ajustment of the sequence of disengagement of said clutches.

9. A dual clutch unit comprising a rotatable casing, a twin-plate clutch and a single-plate clutch mounted in tandem within said casing, a sleeve drivably mounting the twin-plate clutch and constituting the power transmission input shaft of an agricultural tractor, a power takeoff shaft drivably mounting the single-plate clutch and extending through said sleeve, three axially-spaced pressure plates mounted for axial movement within said casing, said presure plates each actuating one of the clutch plates, two sets of springs holding the three pressure plates equidistant from one another, means for moving the pressure plates of the twin-plate clutch to disengage said twin-plate clutch mechanism interconnecting pressure plates of the respective clutches for enabling further movement in the same direction of the pressure plates of the twin-plate clutch to disengage the single-plate clutch, said mechanism comprising adjustable means being so arranged that the amount of movement of the pressure plates of the twin-plate clutch prior to the commencement of disengagement of the single-plate clutch is both adjustable and measurable from outside said casing.

10. A dual clutch unit comprising a rotatable casing, two normally engaged clutches mounted in tandem within said casing and each comprising at least one driven clutch plate, pressure plate means for separately actuating each of said clutches, lever means for moving the pressure plate means of one of said clutches in one direction to disengage said one clutch, and mechanism independent of said lever means for directly interconnecting said pressure plate means for causing further movement of said pressure plate means for said one clutch in said direction to move said pressure plate means for said other clutch to sequentially disengage the other clutch, said mechanism comprising a member having an axially fixed connection to the pressure plate means for said other clutch and projecting externally of said casing and adjustable means on said member operable only outside the casing for measurably determining the amount of movement of said pressure plate means for said one clutch prior to disengagement of said other clutch.

11. In the dual clutch unit defined in claim 10, said member being a rod having a threaded end outside the casing and said adjustable means being a rotatable axially shiftable abutment on said rod adapted to coact with means movable with said pressure plate means for said one clutch.

References Cited by the Examiner
UNITED STATES PATENTS

| 2,822,071 | 2/1958 | Hautzenroeder | 192—48 |
| 3,018,863 | 1/1962 | Elfes | 192—48 |
| 3,174,602 | 3/1965 | Schjolin | 162—69 |

FOREIGN PATENTS 206,293  11/1959  Austria.

DAVID J. WILLIAMOWSKY, *Primary Examiner.*

DON A. WAITE, *Examiner.*

B. W. WYCHE, III, *Assistant Examiner.*